Figure 1:
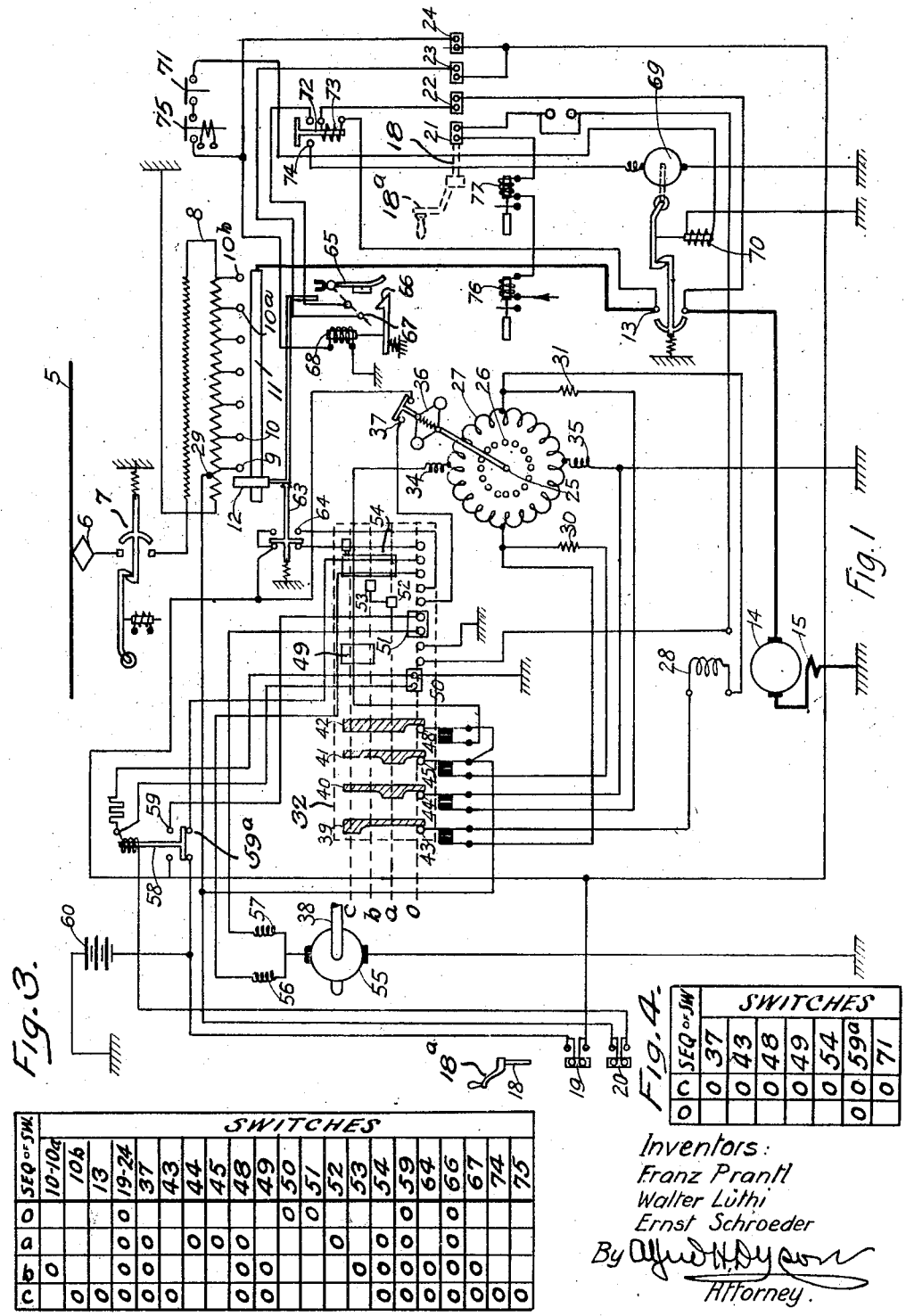

Patented June 24, 1930

1,766,533

UNITED STATES PATENT OFFICE

FRANZ PRANTL, OF WETTINGEN, WALTER LUTHI, OF ENNETBADEN, AND ERNST SCHROEDER, OF BADEN, SWITZERLAND, ASSIGNORS TO A. G. BROWN BOVERI & CIE., OF BADEN, SWITZERLAND, A JOINT-STOCK COMPANY OF SWITZERLAND

REGENERATIVE BRAKING SYSTEM FOR SINGLE-PHASE ELECTRIC-RAILWAY LOCOMOTIVES

Application filed September 11, 1928, Serial No. 305,283, and in Germany September 12, 1927.

My invention relates to regenerative braking of single phase locomotives for electric railways and, more particularly, to regenerative braking with the aid of phase advancers.

The problem of obtaining regenerative braking with single phase commutator motors presents a number of difficulties, of which one is the fact that a machine of that kind, if driven as generator and excited with the current generated by it, will furnish only wattless current. This disadvantage can be overcome, as is well known to those skilled in the art, by exciting the A. C. commutator machine with current taken from a circuit in which the voltage has a phase displacement of about 90° with respect to the line or supply voltage.

Such circuit may be supplied by a phase advancer which permits the phase difference between the voltage of the supply current and the E. M. F. of rotation in the armature of the A. C. commutator machine to be adjusted to approximately 180°. The excitation voltage will then lag about 90° behind the transformer secondary voltage. Such phase advancer may be of any suitable design but, for the purposes of the present invention, a single phase induction machine having a uniformly distributed stator winding and a squirrel cage rotor is preferable. The phase advancer may be brought up to synchronism by a pony motor or by producing an auxiliary phase. The rotor and stator interact to give a practically circular rotating field even with a single-phase supply. By making connections to two suitably located points in the stator winding, a current may be obtained which differs in phase from the line current by any desired amount. This current is then used for the excitation of the A. C. commutator machine during the period of regenerative braking.

In reducing these well known principles to practice, it has been found that this method of regenerative control has the disadvantage of requiring a large number of switching operations on the part of the locomotive operation, which not only unnecessarily consume time but also provide opportunities for improper switching. The necessary additional means for performing these operations also complicate the equipment in the operator's cab to an undesirable degree.

It is of special importance for the safe operation of control apparatus, of the present invention, that the phase converter start positively under all circumstances. Experience has shown, however, that a machine of this nature is liable to stall during the starting period. The reason for this is the well known poor starting torque of the single-phase induction motor and also the fact that the current taken by such a motor usually contains higher harmonics which cause a counter torque which may be sufficient to overcome the starting torque, thereby preventing the machine from attaining the proper speed.

I have found that by tapping the stator at points somewhat displaced from the diametrically opposite positions, it is possible to vary the wave shape of the motor field more or less at will. In this way an undesirable higher harmonic, which may be present, can be either entirely suppressed or reduced to a negligible value. Thus for example symmetrical connections may give a triangular form to the field, whereas a slight displacement of the tappings will produce a flattened or trapezoidal field approximating more closely to the ideal field of sine form.

Among the objects of the present invention is the provision of a regenerative braking system for single-phase locomotives which performs all the necessary changes in making connections automatically, after the reverser of the locomotive has been turned into the braking position.

A further object of the invention is to provide a control system whereby the phase advancer of such system is automatically started and connected to the single phase machine after it is in proper running condition, whereby the single phase machine is automatically connected to the line, if proper voltage relations are established, and whereby the initial connections of the various elements are automatically re-established if the controlling means are returned to the running position.

Another object of the invention is to provide such connections for the phase advancer that it will not stall during the starting period.

A further object of the invention is to provide connections and control mechanism which will facilitate the handling of a complicated arrangement of this kind, enabling the operator to perform comparatively difficult switching operations by means of the reverser and the main controller and without the necessity of handling any levers additional to the equipment of a locomotive without means for regenerative braking.

Only those circuits are shown which are necessary to fully disclose the design and operation of the invention and all the circuits and apparatus which do not contribute directly to this purpose are omitted. Accordingly only one motor and one set of control apparatus is shown. It will be understood that any suitable method of connecting a plurality of motors and of controlling the motors, known to the art, may be used with the regenerative braking control system of the present invention.

Figure 2:
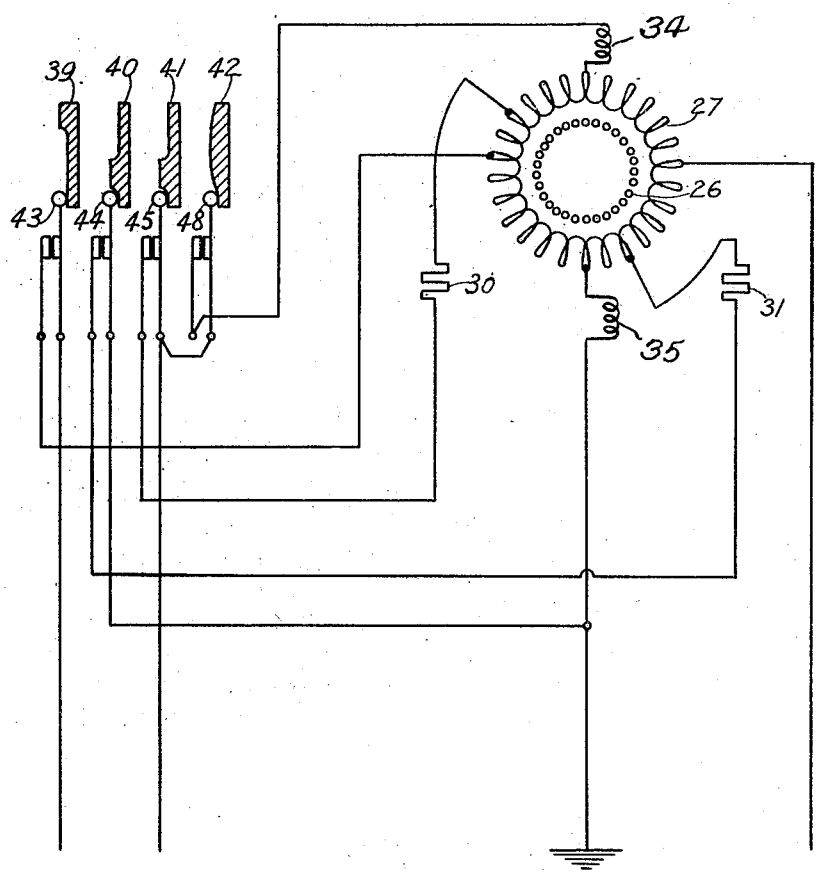

Other objects and advantages will appear in the following description and the accompanying drawings forming a part of this specification in which, for purposes of illustration only, an embodiment of the invention is shown, and wherein Fig. 1 is a diagrammatic representation of the invention showing the connections for a single phase locomotive and Fig. 2 is a diagrammatic showing of the unsymmetrical tappings of the phase advancer.

Figs. 3 and 4 are sequence diagrams showing the switch operation in the system illustrated in Fig. 1.

Referring more particularly to the drawings by characters of reference; a distribution line 5 supplies electric current by means of a pantograph 6 to a high tension circuit breaker 9, provided with a tripping coil and a closing device for connecting a main transformer 8 which is tapped to furnish variable voltages as is customary in this type of system. The tappings of the transformer 8 are connected to a number of contact blocks, of which the two first are numbered 9 and 10 and the two last 10$_a$ and 10$_b$.

The contact blocks can be successively connected to a fixed contact bar 11 by means of a sliding contact 12. This sliding contact is operated by a suitable mechanism producing a step by step motion thereof, which mechanism may be driven by an electric motor, or other suitable means, and which is controlled from the driver's cab. This part of the invention will be referred to hereinafter as "the transformer regulating switch". The step motion producing mechanism and its driving gear, above referred to, has been omitted from the drawing, as not essential to the invention.

From the contact bar 11, the current passes over the low tension switch 13 to the commutator of the single phase driving motor 14 with an auxiliary winding 15 and thence to the earth.

The motor 14 is shown connected ready for regenerative braking. The necessary changes in the motor connections are made by means of a regenerative braking controller, "reverser" 18 with three positions; "forward," "reverse" and "brake". The reverser contacts which make the changes in the motor connections, being unessential to the invention, are not shown in the drawing. Only those contacts which are necessary to complete disclosure of the invention are shown and will be referred to hereinafter. It will be apparent to those skilled in the art that any suitable number and type of commutator motors as well as any convenient type of control gear for the transformer regulating switch and the reverser may be used in connection with the regenerative braking system disclosed. The reverser and the transformer regulating switch are so connected by interlocking means of any suitable construction that the reverser can be moved, by the operator, into its "braking" position only after the transformer regulating switch is in its "zero position", shown in the drawing, by the position of the sliding contact 12.

The reverser has contacts 19, 20 and interlocking contacts 21, 22, 23, 24, which connect the corresponding contacts of the control circuits as soon as the reverser is moved into its "braking" position as shown in the drawing. The contacts 19, 20 and 21, 22, 23, 24 are shown in different locations on the diagram, but they may be located upon the same drum and actuated by the same handle 18$_a$ or may otherwise be relatively fixed. The phase advancer 25 has a rotor 26 and a stator 27, which latter is tapped at four points which are connected to ground, to the field winding 28 of the motor and to a low voltage tapping 29 of the main transformer. These connections are made directly, as well as through ohmic resistances 30, 31 and reactances 34, 35, by way of the phase advancer control switch 32.

The phase advancer control switch 32 consists of a shaft 38 with cams 39, 40, 41, 42, which set switches 43, 44, 45, 48 in four different positions, 0, $a$, $b$, $c$, dependent on the position of the shaft, and a drum with contacts 49, 50, 51, 52, 53, 54, and corresponding fixed contacts, all these cams and contacts being shown developed. The shaft 38 is connected to the rotor of a pilot motor 55 with two sets of field windings 56 and 57, which are so wound that the motor may rotate in either direction dependent on which of the field windings is excited.

A relay 58 closes a contact 59 when its coil is energized and contact $59_a$ when the coil is deenergized. The function of such relay and its mode of operation will be set forth hereinafter in the description of the operation of the device. A current source as battery 60 actuates coils 68, 70 and 73.

An auxiliary switch 63, is arranged to open contacts 64 when the sliding contact 12 is in its zero position, and to close the same when the sliding contact 12 has advanced to the first tap contact block 9. If the contact 12 advances beyond block 9, lever 65 is pulled over until it is engaged by catch 66, thereby closing contacts 67. Catch 66, in turn, is kept in a position where it retains lever 65 by a solenoid 68 which is energized through the contact 19 and the interlocking contact 24 of the reverser 18 above described.

The low tension circuit breaker 13 is operated by a closing motor 69 and a tripping coil 70. The coil 70 is energized through the contact 19 and interlocking contact 24 and trips the circuit breaker 13 as soon as the reverser 18 is rotated to the braking position. The circuit breaker 13 may also be tripped by means of a push button 71. The closing motor 69 is energized through a paralleling relay 72. When the coil 73 of relay 72 is energized, contacts 74 open and remain open as long as there is a difference in potential across the circuit breaker 13. As soon as the voltage on both sides of circuit breaker 13 is nearly equal, there will be no current flowing through the coil 73, contacts 74 will be closed, motor 69 will be energized and switch 13 will be closed, provided that the tripping coil 70 is de-energized at that time. In order to prevent the tripping coil 70 from repeatedly operating during the braking period, a contact 75 is provided which de-energizes coil 70 during this period. Relays 76, 77 for controlling the driving motor (not shown) for the transformer regulating switch are actuated by current from any suitable source.

The purposes of the interlocking contacts 21, 22, 23 and 24, having already been partially described, will not be set forth in greater detail. The contact 21 provides for energization of relays 76, 77 which in turn permit energization of the driving means for the transformer regulating switch when the cam shaft 38 of the phase advancer has placed the cams into either $b$ or $c$ position. The interlocking contact 22 controls energization of the paralleling relay 72; the interlocking contact 23 controls the circuit of the closing motor 69 and interlocking contact 24 controls the holding coil 68 of the catch 66.

The disclosure in Fig. 2 of the drawings shows in what manner the stator 27 of the phase advancer 25 may be tapped at points other than those diametrically opposed to secure better starting by reducing or entirely suppressing undesirable higher harmonics.

In the operation of the present invention, when it is desired to start regenerative braking, the operator turns the transformer regulating switch to its zero position, and is then able to turn the reverser to its "braking" position which is the position of said reverser shown in the drawing. Thereupon relay 58 is energized from transformer tap 29 over contact 20 and contact 50, the cam shaft being in its zero position. Relay 58 closes contacts 59 whereupon motor 55 is energized from battery 60 through contacts 19, 59 and 51. Motor 55 now turns shaft 38 with the cams and drum into position $a$, whereupon the motor circuit is interrupted at 51 so that the motor will come to a standstill in position $a$. In this position, the cam operated switches 44, 45, 48, as well as contact 52 of the drum switch, are closed. The phase advancer 25 is thereby connected to transformer tap 29 through resistance 30 and reactance 34 and to ground through resistance 31 and reactance 35, and will, therefore, start as an induction motor. When the phase advancer 25 has attained the proper speed, speed responsive device 36 closes contacts 37 and a circuit is established from battery 60 through contacts 19, 37, 52 and 51 to the motor, which starts again and turns shaft 38 into position $b$. The circuit of pilot motor 55 is then again interrupted, at 52, and the motor is stopped in this position. Here, switches 44 and 45 again open and the starting devices are thereby disconnected from the phase advancer, which now runs as a single phase induction motor and phase advancer and is ready for connection to the field windings of the commutator machine. In said position $b$ of the regulating switch 32, the circuit, including transformer switch relays 76 and 77, is closed by contact 49. The transformer switch is, therefore, then ready to be moved forward from its zero position.

The operator now advances the transformer regulating switch with its sliding contact 12, closing contact 64 after having passed the first tap contact, closing contact 67 by means of lever 65, which is kept in closed position by catch 66 and solenoid 68, the latter being energized, when the reverser is in "braking" position, from battery 60 through contacts 24 and 19. Motor 55 now again starts from battery 60 through contacts 19, 64 and 53, turns shaft 38 into position $c$, where it is stopped by interruption of the circuit at contact 53. In this position, contact 49 of the drum switch maintains closed its corresponding contacts in the circuit including transformer switch relays 76 and 77. Cam switch 43 is also closed, whereby proper connections between phase advancer and field of the commutator machine are established. The phase advancer is connected to transformer tap 29 through cam switch 48 and to field 28 of motor 15, through cam switch 43. Resistances 30 and 31 are cut off by cam switches 45 and 44, respectively. Transformer switch relays 76 and 77 of the transformer remain in circuit through regulating switch contact 49. The machine will now develop an E. M. F. as a generator, depending in magnitude on the speed of the locomotive. The transformer regulating switch is now further advanced and if the secondary voltage of the transformer and the terminal voltage of the commutator machine are about equal, paralleling relay 72 will close the low tension switch 13, thereby connecting the regenerating machine to the line 5. Relay 72 with its coil 73 is energized as long as there is a voltage difference across the switch 13. If the voltages on both sides are nearly equal, there will be no current flowing in coil 73, the armature will drop and bridge contacts 74 thereby. The circuit of motor 69 is closed from battery 60 through 19, 23, 67 and 74, and the motor closes the switch 13, the tripping coil 70 being de-energized during the braking period by contact 75, as has been above set forth. The operation of contacts 67 and catch 66 has already been referred to; they have the function of restraining the closing of switch 13 until the reverser is in its braking position and until sliding contact 12 is beyond the first tap 9.

In Fig. 3 is shown the sequence of switch operation for regenerative braking from zero position of the phase advancer control switch, through intermediate positions a and b to final position c of said switch.

To interrupt the regenerative braking operation, circuit breaker 13 is tripped with push button 71 and the transformer regulating switch is returned to its zero positions, whereupon the reverser can again be turned to either "forward" or "reverse" running position. This causes the contact at 20 to be interrupted, thereby releasing relay 58, the armature of which falls and closes contacts 59ª so that a circuit from battery 60 over 54 and 56 is established, which causes motor 58 to turn in reverse direction, thus returning cam shaft 38 to its initial position, whereupon the motor is disconnected from the phase advancer which is brought to rest. Figure 4 shows the sequence of switch operation when regenerative braking is interrupted by the tripping of breaker 13. Opposite position c of the phase advancer switch are indicated those switches which are in closed position after the transformer switch is returned to zero position and the reverser is turned from braking position.

Should the line voltage fail during regenerative braking the high tension circuit breaker 7 opens, thereby deenergizing the main transformer and relay 58. As above, motor 55 will return the cam shaft 38 to its initial disconnected position to stop the phase advancer. The low tension circuit breaker 13 can then be tripped by means of the releasing circuit including push button 71.

Although we have illustrated only one embodiment of our invention, it will be apparent to those skilled in the art, that it is not so limited but that various modifications and changes may be made therein without departing from the spirit thereof or from the scope of the appended claims.

What we claim is:

1. In a system of regenerative braking comprising a single phase motor and a phase advancer for changing the phase of current supplied to the field of said motor and comprising a supply circuit, a transformer connected to said circuit, a step switch associated with the transformer for varying the voltage supplied thereby, and a regenerative braking controller, means for automatically connecting said phase advancer to said transformer for starting said advancer and subsequently for automatically connecting said advancer to said transformer and to the field of said motor for regenerative braking, said means being controlled only by said transformer switch and said braking controller.

2. In a system of regenerative braking comprising a single phase motor and a phase advancer for changing the phase of current supplied to the field of said motor, and comprising a supply circuit, a transformer connected to said circuit, a step switch associated with the transformer for varying the voltage supplied thereby, and a regenerative braking controller, starting circuit means for said advancer, and automatically operating means for first connecting said phase advancer to said transformer directly through said starting circuit means; second, for connecting said advancer to said transformer directly and for disconnecting said starting circuit means; third, for connecting said advancer to said transformer and to the field of said motor for regenerative braking, said automatically operating means being controlled only by said transformer switch and said braking controller.

3. In a system of regenerative braking comprising a single phase motor and a phase advancer for changing the phase of current supplied to the field of said motor and comprising a supply circuit, a transformer connected to said circuit, a step switch associated with the transformer for varying the voltage supplied thereby and a regenerative braking controller, starting circuit means for said advancer, and automatically operating means for, first, connecting said phase advancer directly and through said starting means to a low voltage point of said transformer; second, for connecting said advancer to said transformer directly and to disconnect said starting circuit means; third, for connecting said advancer and said motor to points of higher voltage of said transformer and for connecting said advancer to the field of said motor for regenerative braking, said automatically operating means being controlled only by said transformer switch and said controller.

4. In a system of regenerative braking comprising a single phase motor and a phase advancer for changing the phase of current supplied to the field of said motor and comprising a supply circuit, a transformer connected to said circuit, a step switch associated with the transformer for varying the voltage supplied thereby, and a controller having running and regenerative braking positions, automatic means operative when said controller is in its braking position for, first, connecting said advancer to a low voltage point of said transformer for starting said advancer and, subsequently, for connecting said advancer to the field of said motor and connecting said motor to a point of higher voltage of said transformer, said automatically operating means comprising switch means controlled by said step switch whereby connection of said motor to said transformer is made only when said switch is moved from the point of approximately lowest voltage of said transformer to points of higher voltage therein.

5. In a system of regenerative braking comprising a single phase motor and a phase advancer for changing the phase of current supplied to the field of said motor and comprising a supply circuit, a transformer connected to said circuit, a step switch associated with the transformer for varying the voltage supplied thereby, voltage controlled switch means for connecting said motor to said transformer and a regenerative braking controller, automatically operating means controlled by said transformer switch and said braking controller for, first, starting said phase advancer from said supply circuit and subsequently for connecting said phase advancer to the field of said motor for regenerative braking, said motor, after connection of its field to said advancer, being connected to said supply circuit through said transformer when the transformer voltage has been brought to a proper value by said step switch for the operation of said voltage controlled switch means.

6. In a system of regenerative braking comprising a single phase motor and a phase advancer for supplying the field of said motor and comprising a line supply, a transformer connected to said supply, means to vary the voltage supplied by the transformer, voltage controlled switch means to connect the motor to the transformer and a regenerative braking controller, automatically operating means controlled by said transformer voltage varying means and said braking controller for starting said advancer and, subsequently, for connecting said phase advancer to the field of said motor for regenerative braking, said motor, after connection to said phase advancer, being connected to said line supply when the voltage across said connecting means approaches zero, and means for preventing connection of said motor to the line supply unless said braking controller is in its braking position.

7. In a regenerative braking system comprising a phase advancer for the excitation of A. C. commutator machines during regenerative operation, said advancer having a uniformly distributed stator winding, a starting circuit for the advancer connected to taps on the stator of said advancer displaced from the diametrical position.

8. In a system of regenerative braking comprising a supply circuit, a single phase motor and a phase advancer for changing the phase of current supplied to the field of said motor and having a uniformly distributed stator winding, connection means for starting said phase advancer from the supply circuit as a single phase motor, said means comprising taps on said stator winding unsymmetrically placed for changing the field form of said advancer and avoiding the production of undesirable harmonics therein.

9. In a system of regenerating braking comprising a single phase motor and a phase advancer for changing the phase of current supplied to the field of said motor, and comprising a supply circuit and a controller having running positions and a regenerative braking position, means for automatically connecting said phase advancer to said supply circuit and to the field of said motor, and for automatically connecting said motor to said supply circuit for regenerative braking, said means operating only when said controller is in braking position, and automatically operating means for disconnecting said advancer from the field of said motor when said motor is disconnected from said supply circuit to discontinue regenerative braking and when said braking controller is turned from braking position to a running position.

10. In a system of regenerative braking comprising an A. C. motor and a phase advancer for changing the phase of current supplied to the field of said motor and comprising a supply circuit, means for controlling the voltage supplied by said circuit and a regenerative braking controller, means for automatically connecting said phase advancer to said circuit for starting said advancer and subsequently for automatically connecting said advancer to said circuit and to the field of said motor for regenerative braking, said last named means being controlled only by said voltage controlling means and said braking controller.

11. In a system of regenerative braking comprising an A. C. motor and a phase advancer for changing the phase of current supplied to the field of said motor and comprising a supply circuit, means for controlling the voltage supplied by said circuit and a regenerative braking controller, starting circuit means for said advancer, and automatically operating means for, first, connecting said phase advancer to said supply circuit through said starting circuit means; second, for connecting said advancer to said supply circuit and for disconnecting said starting circuit means; third, for connecting said advancer to said supply circuit and to the field of said motor for regenerative braking, said automatically operating means being controlled only by said voltage controlling means and said braking controller.

12. In a system of regenerative braking comprising an A. C. motor and a phase advancer for supplying the field of said motor, a supply circuit, means for varying the voltage supplied by said circuit, voltage controlled switch means to connect the motor to said circuit and a regenerative braking controller, automatically operating means controlled by said voltage varying means and said braking controller for starting said advancer and, subsequently, for connecting said advancer to the field of said motor for regenerative braking, said motor, after connection to said advancer, being connected to said supply circuit when the voltage across said connecting means approaches zero, and means for preventing connection of said motor to said circuit unless said braking controller is in its braking position.

13. In a regenerative braking system comprising a phase advancer for the excitation of A. C. motors during regenerative operation, a winding on said motor and a starting circuit for said advancer comprising taps on said winding displaced from the diametrical position.

14. In a system of regenerative braking comprising a supply circuit, an A. C. motor and a phase advancer for changing the phase of current supplied to the field of said motor, a winding on said motor and connection means for starting said phase advancer from the supply circuit, said means comprising taps on said winding unsymmetrically placed for changing the field form of said advancer and avoiding the production of undesirable harmonics.

In testimony whereof we have hereunto subscribed our hands this 27th day of August, A. D. 1928.

FRANZ PRANTL.
WALTER LUTHI.
ERNST SCHROEDER.